Aug. 27, 1929.  L. E. BLASCO ET AL  1,726,139
PLANTING MACHINE
Filed Jan. 3, 1927   5 Sheets-Sheet 5
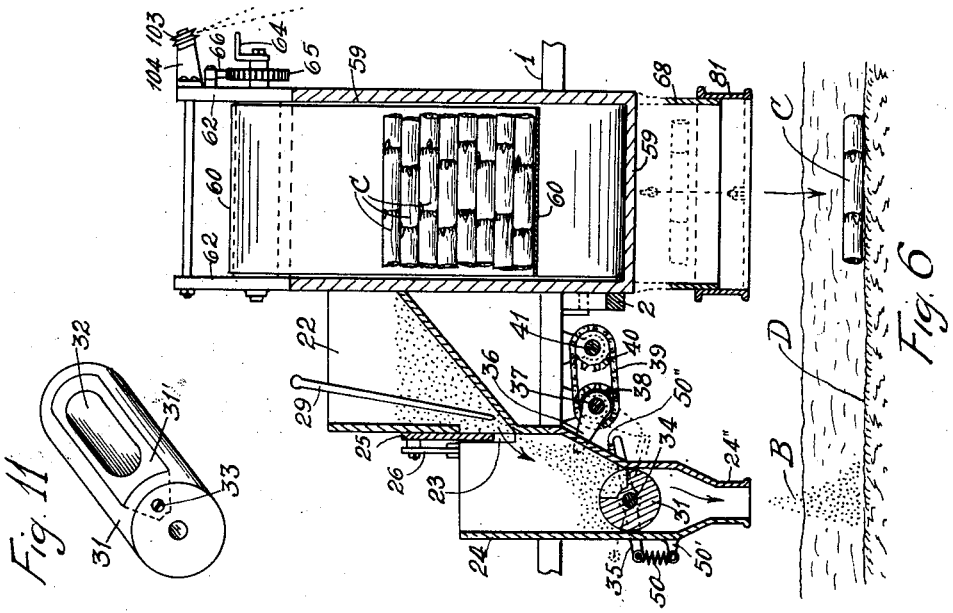
INVENTOR.
L. E. Blasco & A. M.
Achan-y-Portillo
BY
Marks & Clerk
ATTORNEYS.

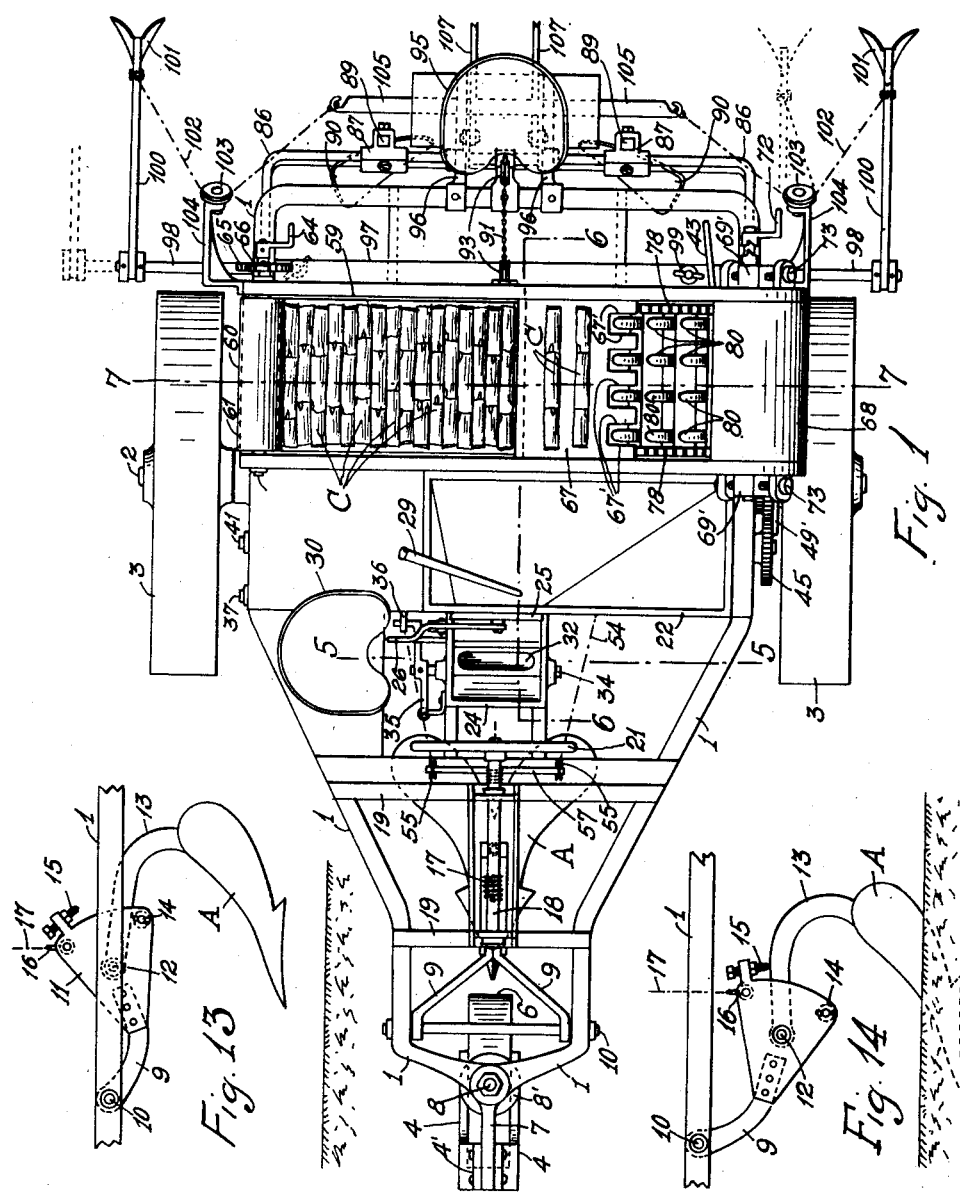

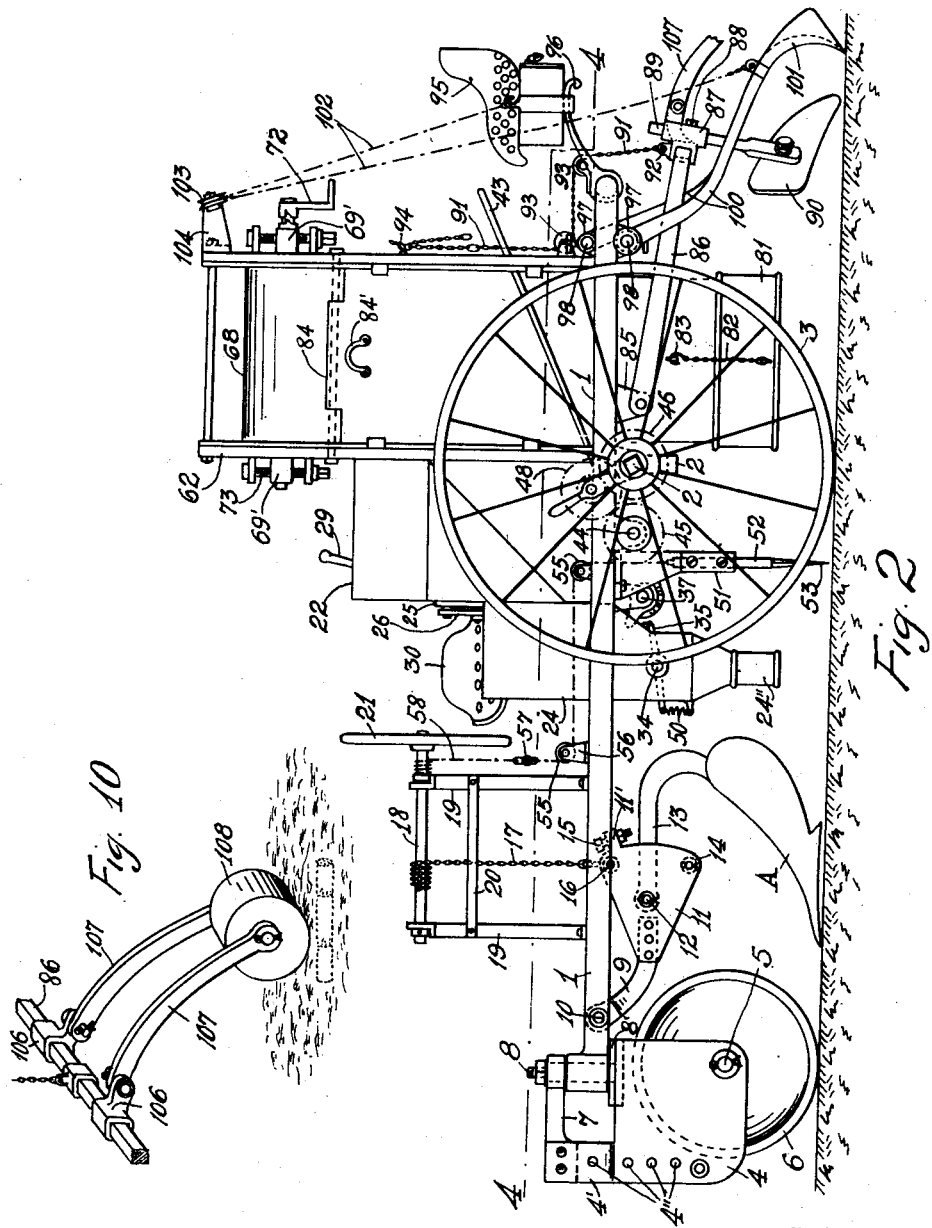

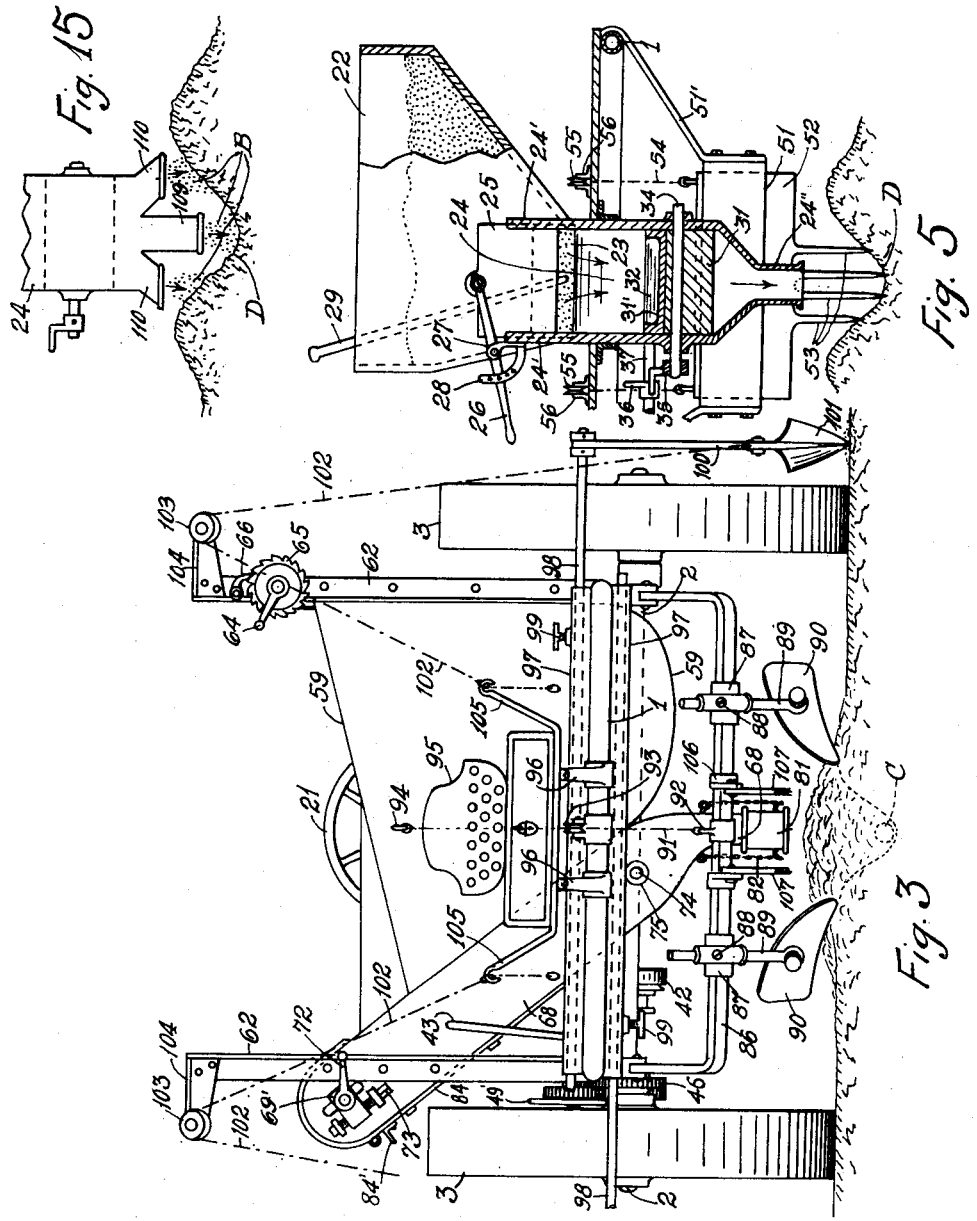

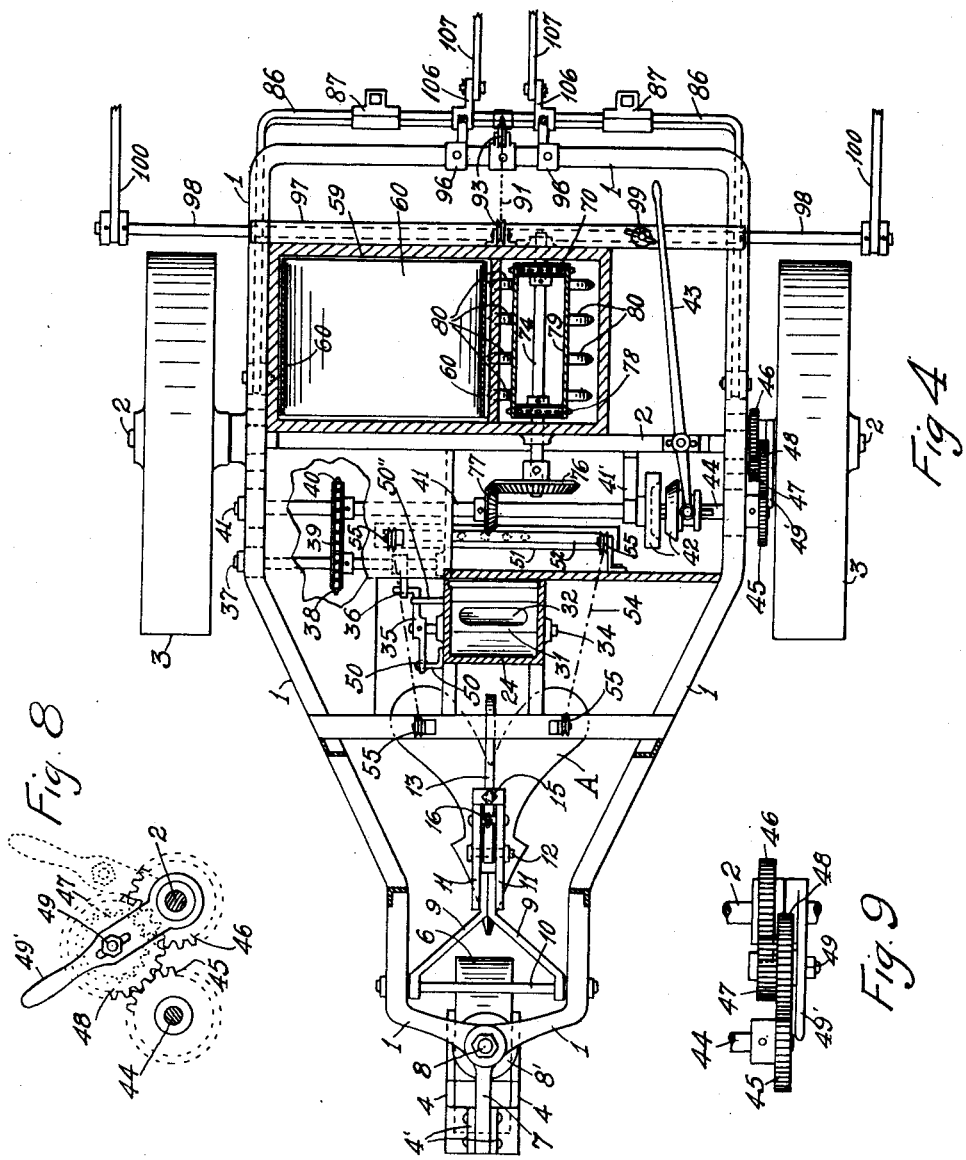

Patented Aug. 27, 1929.

1,726,139

UNITED STATES PATENT OFFICE.

LEÓN ELSO BLASCO AND ANGEL M. ACHAN Y PORTILLO, OF HABANA, CUBA.

PLANTING MACHINE.

Application filed January 3, 1927, Serial No. 158,761, and in Cuba April 15, 1926.

This invention refers to a machine used to perform the five constitutive operations in planting, that is to say, the opening of the furrow, fertilizing of same, sowing of the seed, the covering and the marking of the adjacent furrow which is to be opened; although this machine will be used especially in the planting of sugar cane, it may be applied also to other kinds of cultivation, by simply making a few modifications in the constructive details of the machine.

It is an object of this invention to provide a machine, movable by any power mechanical or animal, and which machine includes a ground plowing element, a furrow fertilizing element, seed sowing element, and a furrow covering element, and an element marking the adjacent furrow to be opened, that is to say, a machine which realizes all the steps necessary to plant the seed in the soil.

Another object of this invention is to provide a planting machine which includes a novel planting mechanism having a deposit with a capacity of no less than 450 to 500 stalks of cane and includes mechanisms which distributes the stalks at intervals, determined beforehand, exactly within the furrow.

In the accompanying drawings, in which the same characters of reference designate the same parts in the different views, Fig. 1 is a top plan view of the machine.
Fig. 2 is a side elevation of same.
Fig. 3 is a rear elevation of the machine.
Fig. 4 is a horizontal section on the broken line 4—4 of Fig. 2.

Fig. 5 is a vertical transverse section in detail on the line 5—5 of Fig. 1.

Fig. 6 is a vertical partial longitudinal section on the line 6—6 of Fig. 1.

Fig. 7 is a vertical partial transverse section on the line 7—7 of Fig. 1.

Figs. 8 and 9 are partial detail views, in side elevation and top plan, respectively of the transmission mechanisms of the machine.

Fig. 10 is a partial detail view, in perspective an element for ramming of the ground after the furrow has been covered.

Figs. 11 and 12 are perspective views, partial and in detail, of the parts pertaining to the fertilizing elements.

Figs. 13 and 14 are side elevations in detail, which show the different operative positions of the plowing element.

Fig. 15 is a partial detail view of a modified form of means for distributing the fertilizer.

The machine consists of a frame or chassis 1, mounted on a horizontal shaft 2 and on the ends of which are fastened the wheels 3, the sides of said frame converging forwardly, being joined, forming the front header of the chassis on which is secured an engagement device, constituted by two plates 4 arranged spacedly and fastened between the two plates is a horizontal shaft 5 on which is mounted the guide wheel 6, said plate ending in ears 4' between which is fastened a bracket 7 which is loosely mounted at its opposite end on a kingbolt 8 secured in the front header of the frame 1 by its corresponding nut. The two plates 4 are integrally joined at the top, and placed between this union and the front header of the frame is a washer 8' for the bolt 8; along the outer lateral borders of the plates 4 are spaced bores 4'' for receiving the connections with the drawing means to be used.

Near to the front header of the frame is set a plow the beam of which is hinged and which includes two sections, the front section comprising a forked arm 9, the ends of which are hinged to a horizontal shaft 10 secured between the lateral end portions of the sides of the frame 1. On each side of the converging ends of the fork 9 are secured two sector-shaped plates 11 and through the same is mounted a horizontal pin 12 on which is pivoted the front end of the rear section 13 of the beam on which is secured the plow A of double mould board type. Between the plates 11 at the lower part is secured a stop 14 which limits the downward movement of the rear section of the beam 13 and at the upper part a projecting ear 11' is located through which a bolt 15 is screwed, the function of which is to regulate the different depths to which the plow is to operate.

Extending between the plates 11 is a pin 16 on which is fastened the end of a chain 17 which is wound on a horizontal shaft 18 mounted rotatably between two standards 19 secured upon the front part of the frame 1, and which standards are reinforced by a tie 20. On the inner end of the shaft 18 is secured a steering wheel 21.

Cooperating with the devices described, and immediately behind the same, is installed fertilizing means, which as detailed in Figures 5 and 6, consists of a fertilizer supply receptacle 22, of a suitable capacity, the bottom of which is sloped, presenting an opening 23 in its lower part, which empties into a second deposit or hopper 24 situated in a lower plane, the discharge of the material from the deposit 22 being controlled by means of a gate 25 movable between guides 24' in the corresponding part of the same receptacle 24, operable by a lever 26 pivoted to the upper part of the gate 25, and to a support 27 secured to one of the sides of the receptacle 24. The lever 26 may be fastened by a pin, in the different workable positions to a sector 28 secured to the upper outer part of one side of the hopper 24. In the case when the material in the receptacle 22 hydrates, not having the necessary freedom for the discharge, there is provided a loose rod 29 to mix the material manually. This operation, as well as the actuating of the lever 26, and the steering wheel 21 may be effected by an operator comfortably seated in a seat 30 fastened to the frame 1 and on one side of same.

The lower part of the hopper 24 is of a funnel shape ending in a collar 24'' and above same is installed a discharge valve, constituted as detailed in Figures 11 and 12 by a solid horizontal cylinder 31, which presents a longitudinal recess 31' receiving a fertilizer gage 32 detailed in Figure 12 with a capacity of a volume determined beforehand, being removably secured in its position by a screw 33. The cylinder 31 is fastened to a horizontal shaft, revolving on bearings which are on the sides of the hopper 24, and on one of its projecting ends is secured a stop 35, which makes an intermittent contact with a cam 36 secured to a horizontal shaft 37, revolving between bearings placed under the frame 1.

To the shaft 37 is secured the sprocket wheel 38, which is moved by a transmission chain 39 which transmits movement to the shaft referred to from a sprocket wheel 40 secured to a longer horizontal shaft 41 mounted rotatably on one side of the frame 1 and on a supporting arm 41' secured to the shaft 2.

The shaft 41 is adapted to be operated through the coupling 42 controlled by the forked lever 43 from a short horizontal shaft 44 revolving on bearings secured under one of the beams of the frame 1. Fastened to the projecting end of the shaft 44 is a gear 45 moved by a transmission gear, formed by a gear 46 keyed to the hub of one of wheels 3 and which wheel 46 meshes with an intermediate pinion 47 keyed to a gear 48 secured to a short shaft 49 carried by the arm 49' and which gearings, shown in detail in Figures 8 and 9, are replaceable by other like pieces of different diameter, when it is desired to obtain different velocities, and being of a type usual in this kind of changeable gearing.

The movement of the cylinder 31 is effected under the pressure of a coil spring 50, secured at its ends to one of the ends of the stop member 35 and to a bolt 50' secured to one side of the hopper 24. The member 35 is held against the tension of the spring 50 by a stop 50''. Behind the hopper 24 is arranged the guide 51 secured to the chassis by braces 51' between which is normally movable a plate 52 which terminates in the rake 53 which drags over the ground, the object of which will be explained further along, its movement being regulated by means of the cables 54 attached to the bolts fastened on the upper border of the plate 52, which cables pass over pulleys 55 mounted on brackets 56 fastened on the frame 1, its ends being tied to a hanging rod 57 which hangs from a cable 58 wound on the shaft 18.

By 59 is designated a receptacle of a capacity determined beforehand, its outer header not being higher than the inner, and within which is suspended a band of cloth or other suitable material 60 which forms a kind of sack on which is placed the stalks of cane which are to serve as seed.

This band 60 is wound at one of its ends on a drum 61 revolvable on a horizontal shaft secured between angular posts 62 fastened on the frame of the chassis 1, but which at the same time, serves to reenforce the structure of the deposit 59.

The other end of the band is fastened at 63 to the lower header of the receptacle 59. The shaft which bears the roller drum 61 is operable manually by a crank 64, this movement being regulated by a ratchet wheel engagement 65 and a ratchet 66, which is pivoted to one of the posts 62.

Over the lower header of the deposit 59 is secured a sloped table, the lower end of which is recessed, as indicated in 67' next to an endless belt enclosed in a casing 68 and which comprises two pairs of sprocket wheels 69 and 70, of which the upper pair of wheels 69 is mounted on an axle 71 revolvable between bearings 69', on the side of the casing 68, and on the projecting end of which is fastened a crank 72, there being provided also a stretching device 73.

The lower wheels 70 are mounted on a horizontal shaft 74 revolvable on bearings 75 installed in the lower part of the casing 68, there being secured on the projecting end of this shaft the conical pinion 76 which meshes angularly with a pinion of smaller diameter 77 mounted on the shaft 41.

The belt itself is formed by chains 78 which pass around the pairs of wheels 69 and 70, and by slats 79 which as may be seen in Figure 7, present teeth 80, arranged spacedly and bent backwardly, in relation to the band of the conductor which moves upwardly, so as to facilitate the grasping and transfer of the stalks of cane as will be seen further along.

The casing 68 ends in an outlet neck 68' having a collapsible extension 81 thereon hanging adjustably from chains 82 and engageable in bolts 83 arranged at variable heights on the outer sides of the neck 68' and of the extension 81 itself. Said casing has a removable side 84 for inspection and it is provided with a handle 84'.

Under the rear part of the frame 1 are secured the hanging brackets 85 on which are pivoted the ends of the branches of a holder 86, on the central part of which are movably mounted two hubs 87, fixed screws 88, the bars 89 carried by the hubs have removably secured thereto the furrow covers formed by plates 90, of a triangular shape and slightly concaved on the inner face, and the narrowest ends of which are directed convergently the one in the direction of the other.

The holder 86 is suspendable by means of chains 91 secured by bolts 92 and passing over pulleys 93 and being fastened on hooks 94 secured to the receptable 59 within reach of the hand of the operator who is seated on a seat 95 supported by brackets 96 fastened to the rear header of the frame 1.

Two sleeves 97 are fastened near the rear part of the frame 1 respectively over and under same, and through which are placed rods 98, adjustably fixed by screws 99, and on the ends of which are mounted the bars 100 and to the ends of which are secured the gauges or furrow markers 101. These markers are adjusted at will, and for this object are provided the ropes 102 secured at one end to the bars 100 and being guided over pulleys or rollers 103 revolvable in brackets 104 secured to the posts 62, and engaged in the hooked ends of a rod 105 secured horizontally under the seat 95.

On the central part of the bearer 86 are mounted the square hubs 106 which have extensions to which are hinged the ends of down-turned brackets 107, which bear between their lower ends a horizontal shaft on which is mounted a roller 108 adapted to come in contact with the soil.

In Figure 15 is shown a modified construction of the fertilizer discharging hopper, if it be desired that the fertilizer not only be deposited in the bottom of the furrow, but also in the sides of same. To this effect the neck is constituted by a central neck 109 arranged to discharge the fertilizer on the bottom of the furrow itself, and two shorter necks 110 directed obliquely in opposite directions and which discharge or spread the fertilizer on the sides of the furrow.

The operation of this machine is as explained in the following:

First, the procedure is to regulate the depth to which it be desired to furrow with the plow A, using for same the screw 15, the depth of the furrow being varied, in accordance with the adjustment of this screw. A gauge 32 for delivering the desired quantity of fertilizer at each operation is selected and gear wheels 46, 47 and 48 of proper size are applied to use.

Also before beginning the operation of planting, endless belt 79 is loaded, the coupling 42 being disconnected, the shaft 71 is turned by the crank 72, thereby turning the wheels 69 and 70, and the cane stalks in the receptacle 59 will slide over the slope 63, until the belt 79 is fully loaded.

Now, in this condition, the machine is placed at the head or end of the main furrow with the point of the plow A towards the front, the coupling 42 disconnected as explained, and the gauge or marker 101 resting on the soil.

The steering wheel 21 fixed to the shaft 18 is turned so as to unroll the chain 17 and permit the plow A to descend and enter the soil to the desired depth; which depth is limited when the hinged beam of the plow completes its turn around the pin 12 and touches the rear part 13 with the screw 15, with which both sections 9 and 13 of the beam become rigid, the beam thereafter turning as a unit around the pivotal point 10 all as shown in Fig. 14.

As soon as the machine begins to travel the operator in the front seat 30, works the lever 26 which opens the gate 25 of the fertilizer and the one seated in seat 95 operates the lever 43 which engages the coupling 42 transmitting the movement by means of the gearing 45, 46 and 47 to the wheels 39 and 40.

When the cam 36 engages with the stop 35 the cylinder 31 is operated to deposit fertilizer, the spring 50 causing the cylinder to return to its original position, this movement being limited by the stop 50''.

In the meantime the rake 53 will have been placed in contact with the soil; when the machine begins to work by unrolling the cables 54 which are wound on the shaft 18 sufficiently, the operator in seat 30 accomplishing same by manipulating the wheel 21, and the rake will spread the layer of fertilizer which will have been discharged in piles through the neck 24''.

The movement of the chain 78 and teeth 80 feed the stalks of cane C towards the mouth of the discharge 68' and deposit them in the furrow D on the layer of fertilizer B, already discharged by the fertilizer mechanism, the extensible arrangement of the collapsible neck 81, facilitating the placing of the cane stalks exactly in the bottom of the furrow D by means of the graduation chains 82, engageable at adjustable heights in the bolts 83.

The continuous delivering of the cane stalks from the deposit 59 to the casing 68 over the slope or inclined plane 63 is maintained by the crank 64 which causes the drum 61 to turn, rolling up one end of the band 60 which supports the load of stalks, so that the level of the load of cane stalks in the deposit 59 is situated above the highest end of the slope or inclined plane 63. Of course when the supply of cane stalks in the deposit 59 has been completely exhausted, the band 60 on the drum 61 is unrolled, and another load of cane stalks is placed on said band.

In the meantime, the furrow D, which has been opened by the plow A and on which has been deposited or spread a layer of fertilizer, and in which the stalks have been placed, at spaced intervals is covered by the coverers 90, which operation may be stopped at will, by simply raising the bearing frame 86 by means of the chain 91. The distance between furrows will also have been previously adjusted in accordance with the size of the furrow plowed.

The markers or gauges 101 carried by the rods 98, adjustable through the sleeves 97 will make two smaller furrows on each side of the furrow opened by the plow A which will indicate the position of the adjacent furrows to the furrow just opened.

It will be noted that in accordance with the running direction of the machine, and the configuration of the field which is to be planted, only one of the markers or gauges, either the one on the right or the one on the left will be operated, and when the planting of the furrow is finished, the marker or gauge will be raised, by raising or pulling the chain or cable 102 which is engaged in the hook 105, so that the machine will be able to turn and commence the work on the next furrow.

The roller 108 will flatten the loose earth which has been placed by the coverers 90 within the furrow already planted and fertilized. The roller 108 is adjusted with the coverers as has been explained.

Once the furrow has been planted, the operator in the seat 30 will raise the plow A by turning the hand wheel 21, on which is wound the cable or chain 17, and the plow A returning to the position shown in Fig. 13. The coupling 42 is disconnected by the operator in the seat 95, and the bearing frame 86 with the coverers 90 and roller 108 are raised by the chain 91.

Claim:

In a planting machine, a seed receptacle including a bottom part constituted by a flexible band, means for elevating said band to elevate the contents thereof, an inclined table extending from the receptacle, and an endless conveyor arranged adjacent the lower end of the inclined table and disposed at an inclination opposite to that of said table, a seed outlet member arranged below the endless conveyor, an extension part movably mounted on the outlet member, and means for restricting the downward movement of the extension with regard to the outlet member.

In testimony whereof we affix our signatures.

LEÓN ELSO BLASCO.
ANGEL M. ACHAN y PORTILLO.